(12) United States Patent
Will et al.

(10) Patent No.: US 9,643,684 B2
(45) Date of Patent: May 9, 2017

(54) NARROW PROFILE STRADDLE-TYPE MOTORIZED SNOW VEHICLE

(71) Applicant: BRC ENGINEERING LTD., Calgary (CA)

(72) Inventors: Riley Will, Calgary (CA); Steven Lorne Buffel, Calgary (CA)

(73) Assignee: BRC ENGINEERING LTD., Calgary, Alberta (\*) Notice: Subject to any disclaimer, the term of this patent is extended or adjusted under 35 U.S.C. 154(b) by 0 days.

(21) Appl. No.: 14/848,217

(22) Filed: Sep. 8, 2015

(65) Prior Publication Data
US 2017/0066502 A1 Mar. 9, 2017

(51) Int. Cl.
*B62M 9/06* (2006.01)
*B62M 27/02* (2006.01)
*B62D 55/12* (2006.01)

(52) U.S. Cl.
CPC ............ *B62M 27/02* (2013.01); *B62D 55/12* (2013.01); *B62M 9/06* (2013.01); *B62M 2027/021* (2013.01); *B62M 2027/028* (2013.01)

(58) Field of Classification Search
CPC B62M 27/00; B62M 27/02; B62M 2027/021; B62M 2027/025;
(Continued)

(56) References Cited

U.S. PATENT DOCUMENTS 741,211 A * 10/1903 Abrahamovitz ....... B62M 27/02
180/183

939,194 A * 11/1909 Hayes .................... B62M 27/02
180/191
(Continued)

FOREIGN PATENT DOCUMENTS

| CA | 2375653 A1 * | 9/2003 | ............. B62D 61/10 |
| CA | 2604120 A1 | 3/2008 | |
| JP | H04201690 | 7/1992 | |

OTHER PUBLICATIONS

Canadian Intellectual Property Office—Official Action dated Jan. 21, 2016 for Canadian patent application No. 2,902,973 entitled Narrow Profile Straddle-Type Motorized Snow Vehicle.

*Primary Examiner* — Joseph Rocca
*Assistant Examiner* — Maurice Williams
(74) *Attorney, Agent, or Firm* — Gowling WLG (Canada) LLP; D. Doak Horne

(57) ABSTRACT

A narrow-profile straddle-type motorized snow vehicle specially configured and adapted for traversing inclined mountain slopes, having a continuously variable transmission (CVT), the primary and secondary pulleys thereof mounted rearwardly of the motor and not on the side of the motor to thereby reduce the width of the vehicle in the critical region between the operator's legs where the engine is located and typically straddled by the operator. A single ski is further provided to utilize the narrow profile of the vehicle in the region of the operator's legs, which in conjunction with the re-configured positioning of the vehicle CVT transmission allows the operator to better lean the vehicle when traversing an inclined slope and be able to simultaneously avoid contact with the up slope and/or snow thereon by protruding legs or transmission components which would otherwise impede passage of the vehicle across an inclined slope.

13 Claims, 12 Drawing Sheets

(58) Field of Classification Search
CPC ...... B62M 2027/027; B62M 2027/028; B62M 9/06; B62D 55/06; B62D 55/07; B62D 55/12
See application file for complete search history.

(56) References Cited

U.S. PATENT DOCUMENTS

| | | | | |
|---|---|---|---|---|
| 1,006,083 | A * | 10/1911 | Haight | B62D 55/07 180/9.64 |
| 3,578,095 | A * | 5/1971 | Hauser | B62M 27/02 180/190 |
| 3,709,312 | A * | 1/1973 | McGough | B62M 27/02 180/193 |
| 3,822,755 | A | 7/1974 | Hine | |
| 4,585,429 | A * | 4/1986 | Marier | F16H 61/66227 474/12 |
| 4,613,006 | A * | 9/1986 | Moss | B62K 13/00 180/184 |
| 5,474,146 | A * | 12/1995 | Yoshioka | B62K 13/00 180/184 |
| 5,967,286 | A * | 10/1999 | Hokanson | F16H 55/56 192/110 R |
| 6,070,683 | A * | 6/2000 | Izumi | B62M 27/02 180/190 |
| 6,364,726 | B1 * | 4/2002 | Motose | F02B 61/045 440/86 |
| 6,431,301 | B1 | 8/2002 | Forbes | |
| 6,860,826 | B1 * | 3/2005 | Johnson | B62M 27/02 180/376 |
| 6,923,287 | B2 | 8/2005 | Morii | |
| 7,475,751 | B2 | 1/2009 | Pard et al. | |
| 7,617,899 | B1 * | 11/2009 | Warner | B62M 27/02 180/190 |
| 7,789,183 | B2 | 9/2010 | Sadakuni et al. | |
| 8,910,738 | B2 | 12/2014 | Mangum | |
| 9,016,420 | B1 * | 4/2015 | Gauthier | B62M 27/02 180/190 |
| 2002/0129982 | A1 * | 9/2002 | Harle | B62M 27/02 180/182 |
| 2003/0159868 | A1 * | 8/2003 | Alexander | B62M 27/02 180/190 |
| 2003/0221890 | A1 * | 12/2003 | Fecteau | B62J 1/12 180/210 |
| 2004/0040768 | A1 * | 3/2004 | Yamamoto | B60K 5/02 180/190 |
| 2005/0205319 | A1 * | 9/2005 | Yatagai | B62M 27/02 180/190 |
| 2005/0252705 | A1 * | 11/2005 | Abe | B62M 27/02 180/190 |
| 2005/0287881 | A1 * | 12/2005 | Hill | B62D 49/0671 440/25 |
| 2007/0246268 | A1 * | 10/2007 | Snyder | B62D 55/065 180/9.44 |
| 2012/0247852 | A1 * | 10/2012 | Fecteau | B62M 27/02 180/193 |
| 2015/0114343 | A1 * | 4/2015 | Bernier | F02D 9/02 123/337 |
| 2015/0267792 | A1 * | 9/2015 | Hochmayr | F16H 63/065 474/14 |
| 2016/0090905 | A1 * | 3/2016 | Kai | F02B 39/04 123/559.3 |

* cited by examiner

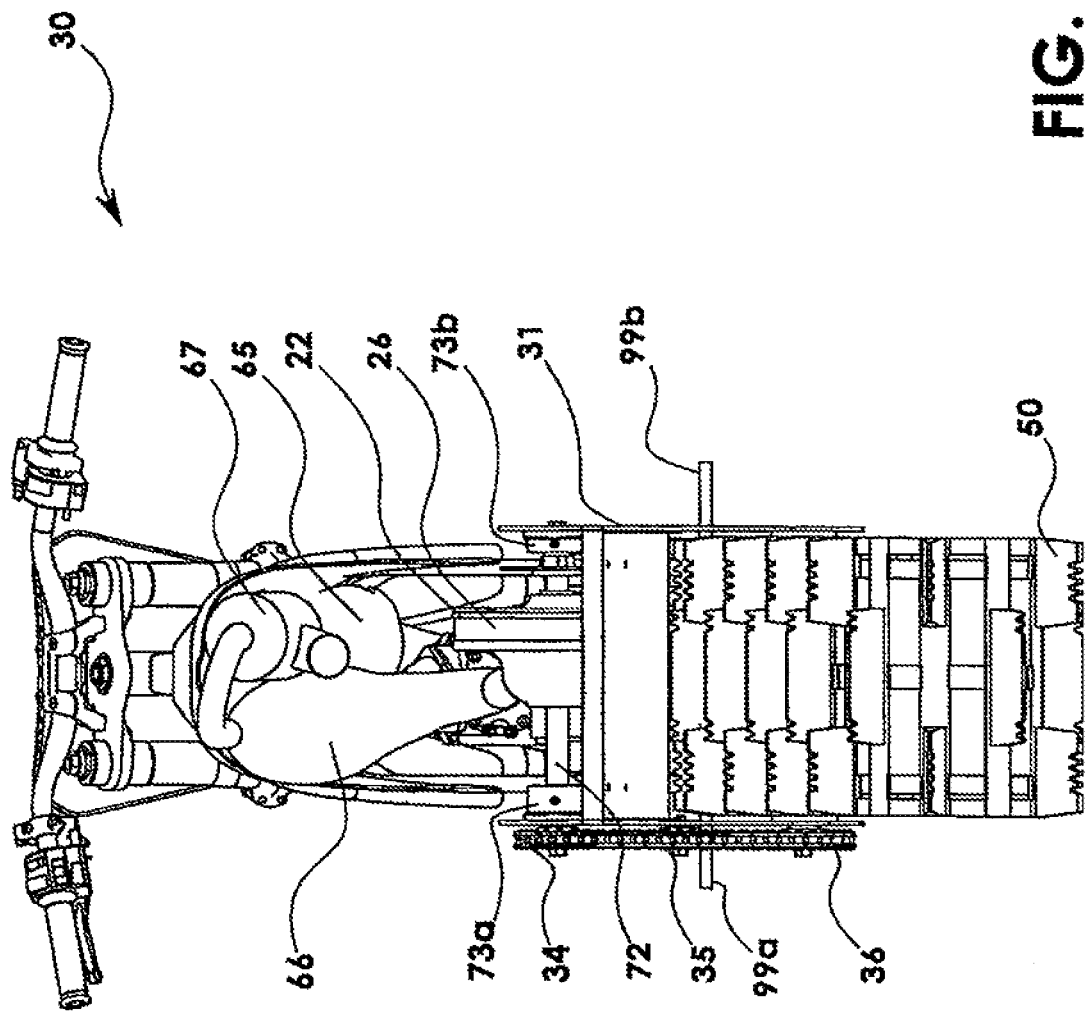

NARROW PROFILE STRADDLE-TYPE MOTORIZED SNOW VEHICLE

FIELD OF THE INVENTION

The present invention relates to motorized snow vehicles, and more particularly to straddle-type motorized tracked snow vehicle.

BACKGROUND OF THE INVENTION AND DESCRIPTION OF PRIOR ART

This background information is provided for the purpose of making known information believed by the applicant to be of possible relevance to the present invention. No admission is necessarily intended, nor should be construed, that any of the preceding information, or the reference in the drawings to "prior art" constitutes prior art against the present invention.

Straddle-type motorized vehicles having an endless track for travelling on snow are well known since at least the 1960's.

Early versions of such motorized tracked vehicles typically incorporated a pair of parallel spaced-apart skis mounted forwardly of the vehicle and connected to a pair of handlebars for steering the vehicle and supporting the front of the vehicle on snow.

Such dual-ski snowmobiles were and remain particularly unsuited for traversing inclined snow-covered slopes. Specifically, due to such dual ski design the vehicle must incline in accordance with the amount of incline of the slope, thereby producing a tendency for the vehicle and operator to roll downhill making such vehicles especially unsafe, as the vehicle may when traversing an inclined slope roll, and more particularly roll over the operator, seriously injuring or killing him/her.

Although some dual-ski snowmobiles, such as that depicted in U.S. Pat. No. 6,923,287, had motor speed reduction gearing mounted in front of the engine rather than beside the engine, and effectively thereby reduced the width of such vehicle, such was more due to limited lateral engine room on a dual ski platform rather than any desire to reduce engine width. Due to the dual ski configuration such models of snow vehicle remained relatively wide and thereby suffered the problems discussed below when traversing inclined slopes.

Single ski motorized tracked vehicles, obviously of lesser width due to the single ski as opposed to the dual ski design, were developed typically from a desire to convert an existing motorcycle to a tracked snow vehicle.

For example, U.S. Pat. No. 8, 910,738 entitled "Snow bike Conversion System", U.S. Pat. No. 3,822,755 entitled "Kit for Converting Conventional Motorcycle into Snowmobile", and U.S. Pat. No. 6,431,301 entitled "Snow Vehicle Conversion Kit" together typify prior art kits for converting a motorcycle to a motorized snow vehicle in which the resulting conversion is a snow vehicle having a single ski.

Such kits (and other similar kits) typically provided a single ski which was adapted to be mounted on (or to replace) the front tire of the motorbike, and further provided an endless-track bogey suspension to replace the rear wheel, with motive force to such track and suspension system being supplied by the existing motorcycle motor.

Notably, the resulting snow vehicles arising from such prior art kit conversions were generally extremely unsatisfactory for traversing inclined mountain slopes.

Specifically, motorcycles (and the types mentioned in the aforementioned patents) typically possess kick-activated transmissions mounted to a lateral side of the motor, thus increasing the width of the resulting snow vehicle in the region of the motor, which is typically the region where the operator's legs are positioned when straddling and operating the vehicle. With the added width of the operator's legs, the combined width of the vehicle in the region of the engine causes problems and danger when the operator of the resulting snow vehicle attempts to traverse a steep inclined snow-covered slope. Specifically, when the operator leans such snow vehicle into a steep inclined slope to otherwise prevent sliding down the slope, due to the substantial width the operator's legs will typically contact the up-hill side of the slope resulting in the operator being unable to sufficiently lean the vehicle into the slope of the hill to avoid sliding down the hill. Alternatively, if the operator nevertheless leans into the hill, contact with the operator's uphill leg and the slope causes a buildup of snow on the uphill side of the vehicle preventing further passage of the vehicle along the slope, or alternatively due to forward momentum of the vehicle causes the operator to be brushed off the vehicle by the buildup of snow thereby cause the operator to lose complete control of the vehicle and/or suffer injury.

Various dedicated (i.e non-kit) single-ski snow vehicles have recently been developed and commercially offered for sale.

For example, U.S. Pat. No. 7,475,751 entitled "Snow Vehicle" assigned to Bombardier Recreational Products Inc. teaches such a single-ski non-kit snowmobile, having a forward mounted transverse muffler mounted forward of the engine. Although the possibility of utilizing a continuously variable transmission (CVT) is offered as a possibility (ref. col. 4, lines 9-11), no further details are provided as to how such could be implemented. Moreover, little importance was devoted in such design to reducing the width of the snow vehicle, since such design further provided a fan 69 disposed on the right side of the engine (ref. col. 4, lines 32-33) as shown in FIGS. 2-3 and FIG. 6, as well as a centrifugal clutch 56 likewise mounted on an opposite side of the engine (ref. FIG. 1, 4 & 5). Both of such aforementioned components clearly served to increase the width of the engine, thereby providing relatively large vehicle width when combined with the operator's legs/boots when the operator straddled the vehicle while operating it. Such excess width results in reduced side hill clearance, which in turn limits the amount of incline of a slope that such vehicle would be capable of safely traversing.

Similarly, U.S. Pat. No. 7,789,183 entitled "Personal Snow Vehicle" assigned to Yamaha Motor Corp. likewise teaches a non-kit, single ski motorized snow vehicle. Although such patent extols the advantage (of a single ski) and handle bars as a manner of reduced vehicle width in providing "motorcycle-like" handling (ref. col 8, lines 9-19), such patent nonetheless overlooks engine and powertrain width as a factor in reducing side hill clearance of the vehicle. To the contrary, transmission 44 appears to be mounted on the side of engine 42, and protruding portions 160 on vehicle body frame 20 significantly increase engine width in the region of the operator's legs providing clear evidence that no consideration was given to increasing side hill clearance by eliminating or otherwise repositioning such outwardly extending accoutrements.

Accordingly, a clear need exists for snow vehicle adapted to allow better and more safe traversing of inclined slopes.

SUMMARY OF THE PRESENT INVENTION

It is thus an object of the present invention to provide a motorized tracked snow vehicle which is well suited for effectively and safely permitting traversal of steep inclined slopes without tipping or slipping down the slope.

It is a further object of the present invention to provide a motorized straddle-type tracked snow vehicle of reduced width in a region of the operator's legs and feet.

It is a still further object of the present invention to provide a snow vehicle which allows increased leaning of such vehicle into a slope of a hill being traversed, to thereby allow better gripping of the vehicle on the slope of hill and thereby reduce the tendency of the vehicle to slide down the hill, roll over, or alternatively due to impaction of snow on the uphill side of the vehicle with the operator's legs, which impaction otherwise prevents continued movement of the vehicle along the slope or potentially causes dislodgement of the operator from the operating position on the vehicle.

It is a still further object of the present invention to provide a single-ski snow vehicle with a continuously variable transmission ("CVT"), and in particular a CVT entirely located aft of the engine to not only reduce lateral width of the vehicle, but to further avoid the need to change gears using a "kick" type motorcycle transmission which is awkward and difficult to do for snowboot-clad operators of snowmobiles.

It is a still further object of the present invention to provide an power transmission system configured so as to allow space immediately rearwardly of the motor to allow directing exhaust pipes in such vacant space where the exhaust pipe(s) would otherwise have to be directed on a side of the vehicle thereby undesirably increase the width of the vehicle.

Accordingly, in order to provide inter alia the above objects and to provide a motorized snow vehicle suited to traversing steeply inclined snow covered slopes, in a first broad embodiment the present invention provides a narrow-profile straddle-type motorized snow vehicle, comprising:

a single ski mounted forwardly of the vehicle for steering said vehicle;
a rotatable endless track for providing propulsion in snow;
a motor, mounted rearwardly of said single ski;
a continuously variable transmission, located rearwardly of said motor, having:
  (i) a primary pulley mounted rearwardly of the motor and located along a vertical plane aligned with a central longitudinal axis of said vehicle and located proximate said longitudinal axis of said vehicle, said primary pulley mounted on a first transverse shaft which is operatively coupled to said motor, a rotational axis of said first transverse shaft being transverse to a direction of travel of said snow vehicle;
  (ii) a secondary pulley mounted rearwardly of said primary pulley and in said same vertical plane, said secondary pulley mounted on a second transverse shaft, said second transverse shaft being positioned parallel to but spaced rearwardly from said first transverse shaft;
and
a driven pulley or toothed sprocket mounted rearwardly of where an operator's leg would be positioned when operating the vehicle, mounted for rotation on a third transverse shaft which is parallel to said first and second transverse shafts, said third transverse shaft extending within said endless track at a proximal end of said endless track for rotating said endless track, said driven pulley or toothed sprocket mounted on an end of said third transverse shaft adjacent said proximal end of said endless track and operatively coupled to said second transverse shaft.

Advantageously, by using a CVT, due to its linear configuration, the vehicle transmission may be located behind and not beside the engine, and in such configuration on a straddle-type vehicle of the present invention, thereby reduces the width of the vehicle while being able to effectively drive the endless track of the vehicle with a minimum number of idler gears and/or belts. In preferred embodiments, the CVT further incorporates an integral clutch, thereby advantageously eliminating any further motor width increases due to having to otherwise possibly incorporate a centrifugal clutch on a side of the motor, as is typically done in motorcycles.

In one embodiment, the driven pulley or toothed sprocket mounted on the third transverse shaft which drives/powers the endless track is positioned on said vehicle rearwardly of said primary pulley so as to better ensure that such driven pulley or toothed sprocket is not only located remotely from the operators legs (a safety hazard), but moreover does not otherwise increase the width of the vehicle in the region of the operators legs.

In another embodiment, or in combination with one or both of the above embodiments, the third transverse shaft is positioned on the vehicle below the second transverse shaft. In such manner the second transverse shaft and secondary pulley thereon will thus be higher on the vehicle allowing the proximal end of the endless track to be positioned more forwardly on the vehicle and below the second transverse shaft and secondary pulley thereon, thus reducing the length of the vehicle. As well, such allows the second transverse shaft to be vertically more remote from the ground and snow thereon, thereby reducing the tendency for snow to become clogged in the secondary pulley and thus render inoperative the continuously variable transmission mechanism.

In still another embodiment, the third transverse shaft may be positioned on the vehicle below the first transverse shaft. This configuration, particularly in combination with the embodiment where the third transverse shaft is positioned below the second transverse shaft, likewise serves to allow the proximal end of the endless track to be positioned more forwardly on the vehicle and below the second transverse shaft and secondary pulley thereon, thus reducing the length of the vehicle.

The driven pulley or toothed sprocket on the third transverse shaft will typically be operatively coupled to the second transverse shaft by an endless belt or chain, to allow the motor, via the CVT (ie the primary and secondary pulleys) to thereby power the endless track of the snow vehicle.

In a preferred embodiment, the CVT located rearwardly of the motor further includes an integral clutch adapted to decouple the motor from powering the endless track when the motor is at idle rpm.

In a more particular embodiment, the first transverse shaft and/or said second transverse shaft further comprise clutch means, configured to decouple the motor from powering the endless track when the motor is at idle rpm.

In a further embodiment, the centrifugal clutch may on said first transverse shaft, and when engaged operatively couples said primary pulley to said secondary pulley upon high (non-idle) revolutions of said motor.

In a preferred embodiment, an operator-controlled disk brake is further located on said second transverse shaft. The provision of a second transverse shaft indirectly coupled to the endless track of the snow vehicle advantageously provides a means to brake the vehicle over the ground, and when coupled with the feature of the centrifugal clutch being located on the first transverse shaft allows an operator to release the gas, thereby allowing the centrifugal clutch to disengage the primary, secondary, and driven pulleys as well as the endless track from the motor, and allowing the secondary shaft and pulley and driven pulley and endless track to be "braked" to arrest movement of the snow vehicle on the ground.

In a preferred embodiment, again consistent with the objective of minimizing the width of the snow vehicle in the region of the engine, the motor comprises two cylinders, each of the cylinders located in a vertical plane of the longitudinal axis, in a canted "v" format, each cylinder driving a commonly powered crankshaft. The crankshaft of the motor is thus positioned rearwardly of each of said two cylinders and transverse to the longitudinal axis, and is further operatively coupled to the first transverse shaft, wherein the first transverse shaft is located rearwardly of the crankshaft.

In a further refinement of the embodiment of the invention having such positioned two cylinders, again with the purpose and objective of minimizing the width of the snow vehicle in the region of the engine, an exhaust pipe which extends from each of said cylinders is provided, wherein each of said exhaust pipes extend rearwardly from said cylinders into a single combined pipe which extends rearwardly substantially along said longitudinal axis, above said continuously variable transmission and below a seat of said vehicle. In such manner, the exhaust pipes, due to vertical space being created in the frame by the longitudinal spacing of the primary pulley and the rearwardly positioned secondary pulley, the exhaust pipes from the motor can be directed in such vertical created space aft of the cylinders, and need not be directed to the side of the engine which would otherwise negatively affect the width of the vehicle in the region of the engine and in the region of the operator's legs when operating the snow vehicle.

In a further preferred embodiment, the motor is a two stroke piston engine, and may be (and preferably is) a liquid-cooled two stroke engine, but may alternatively be an air cooled motor, and/or a four-stroke motor.

In a further refinement, the motor is not naturally aspirated but is further provided with forced air induction, which may be by way of a supercharger such as a roots blower, or forced induction provided by way of a turbocharger. Again, consistent with the objective of minimizing the width of the snow vehicle in the region of the engine where the operators legs are positioned, any supercharger or turbocharger is located above, behind, or in front of the engine, and not on the side of the engine to avoid increasing width in such region.

The above summary of various aspects and embodiments of the invention does not necessarily describe the entire scope of the present invention. Other aspects, features and advantages of the invention will be apparent to those of ordinary skill in the art upon a proper review of the entire description of the invention as a whole, including the drawings and consideration of the specific embodiments of the invention described in the detailed description.

BRIEF DESCRIPTION OF THE DRAWINGS

For purposes of this application, terms of direction and location used in this specification including the claims to specify location of components on the snow vehicle of the present invention, such as "front", "back", "rear", "rearwardly", "forward", "forwardly", "front", "left", "right", "up", "down", "above", and " below", are each with respect to the intended direction of the snow vehicle, as such terms/directions would be understood by a an operator of a snow vehicle straddling the snow vehicle in a forward-facing driving position.

The following drawings figures depict preferred and non-limiting embodiments of the invention, in which:

FIG. 11 is a rear view of the narrow-profile straddle type motorized snow vehicle of FIG. 5;

DETAILED DESCRIPTION OF SOME OF THE PREFERRED EMBODIMENTS OF THE PRESENT INVENTION

Figure 1:
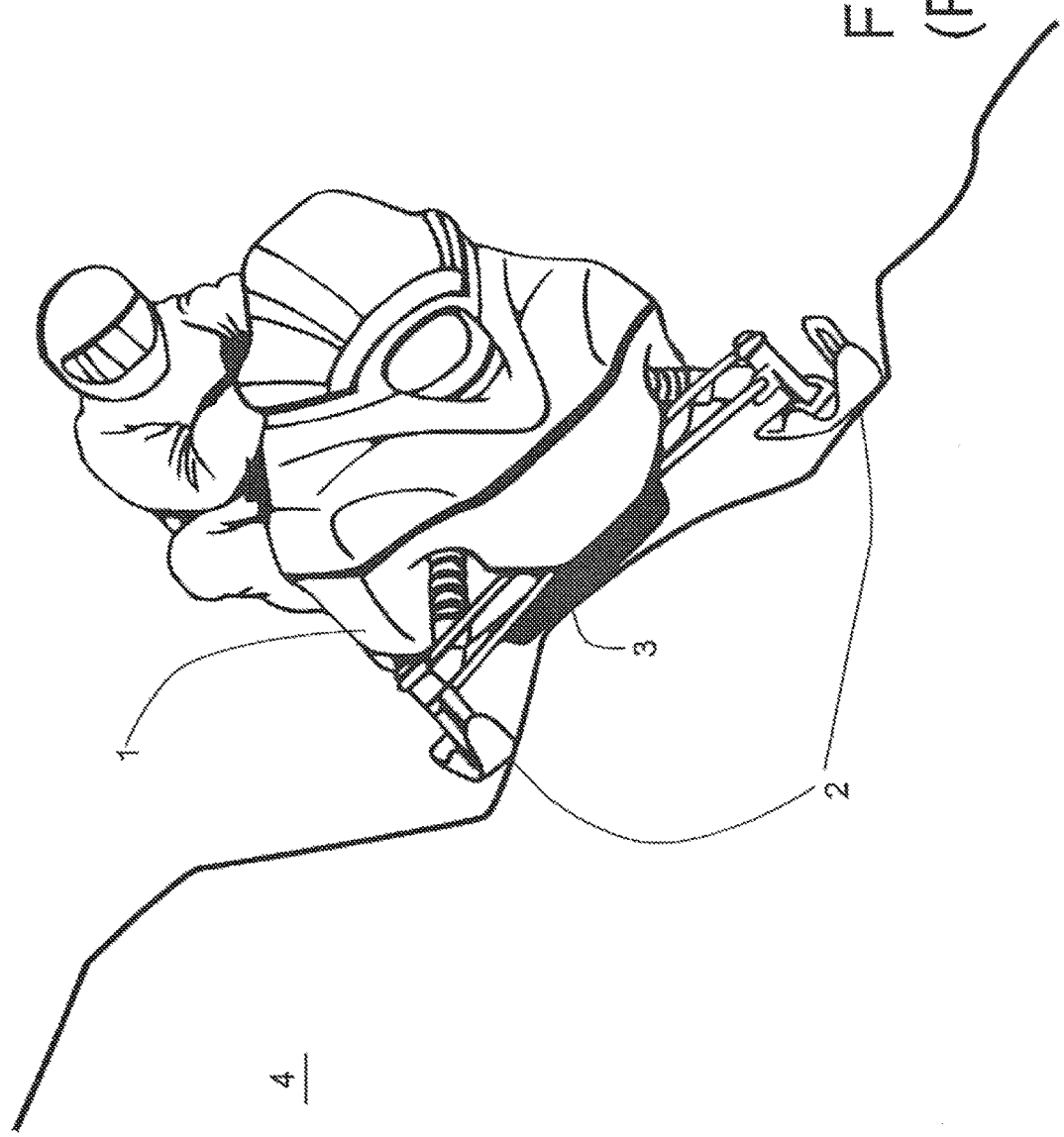
FIG. 1 is a frontal view of a prior-art dual ski snowmobile traversing an inclined slope.

FIG. 1 shows a motorized straddle-type motorized snow vehicle 1 of the prior art, having two frontal skis 2 used for steering and a rear endless belt 3 rotated by a motor (not shown) for advancing the vehicle 1 over snow.

Disadvantageously, when a driver (not shown) of such prior art snow vehicle 1 attempts to traverse a snow-covered steep incline 4 as shown in FIG. 1, vehicle 1 is prone to tipping (rolling over) resulting in the possibility of injury to the driver and any accompanying passenger.

Alternatively, if snow vehicle 1 does not roll over, prior art snow vehicle 1 tends to slide downhill thereby rendering it impossible for the operator to cause snow vehicle 1 to travel in an intended direction when traversing inclined slope 4.

Figure 2:
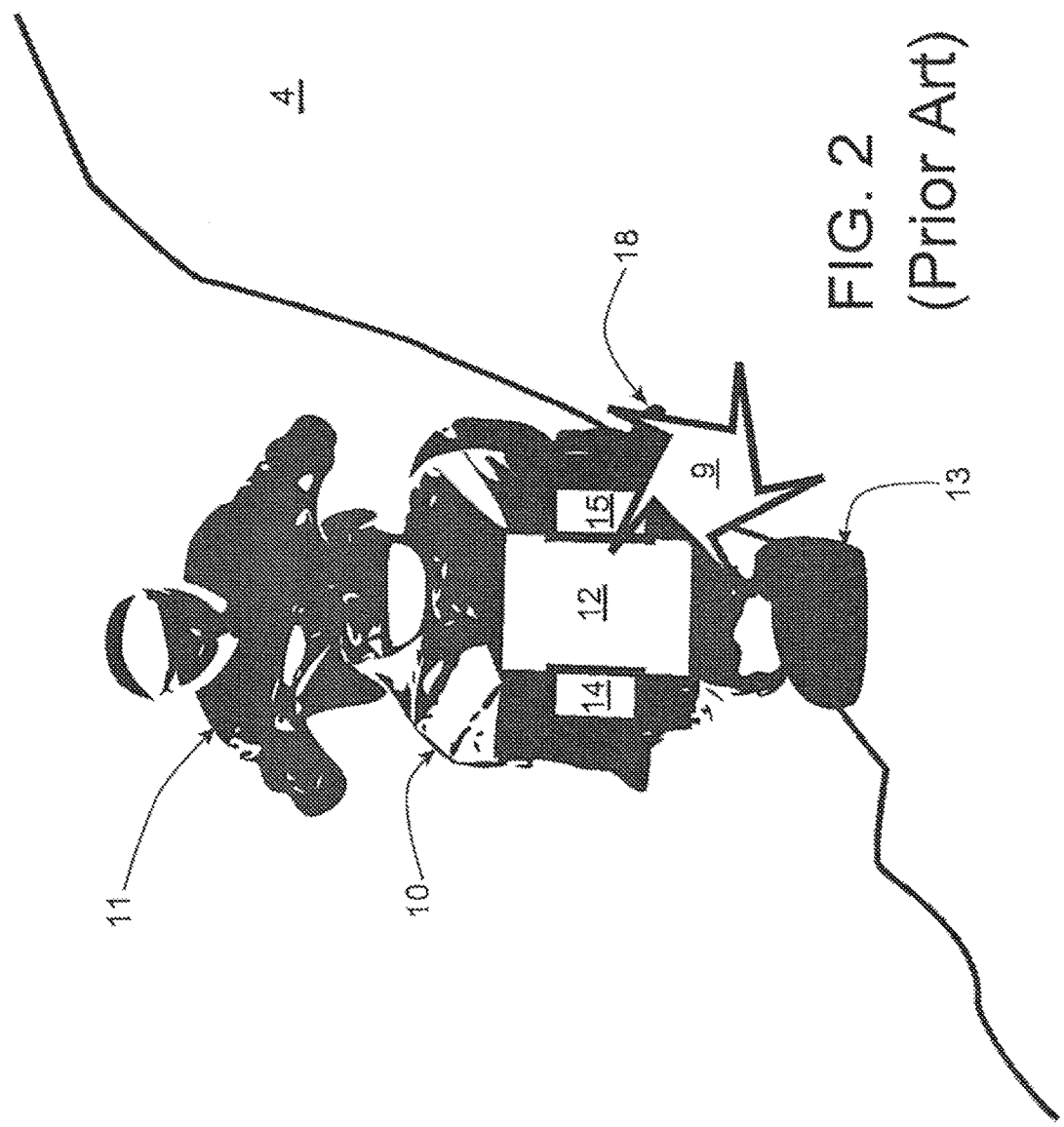
FIG. 2 is a similar frontal view of a prior art single ski snowmobile having a side mounted transmission traversing an inclined slope, showing resulting impaction of snow on the uphill side of the snow vehicle when traversing such inclined slope.
Figure 3:
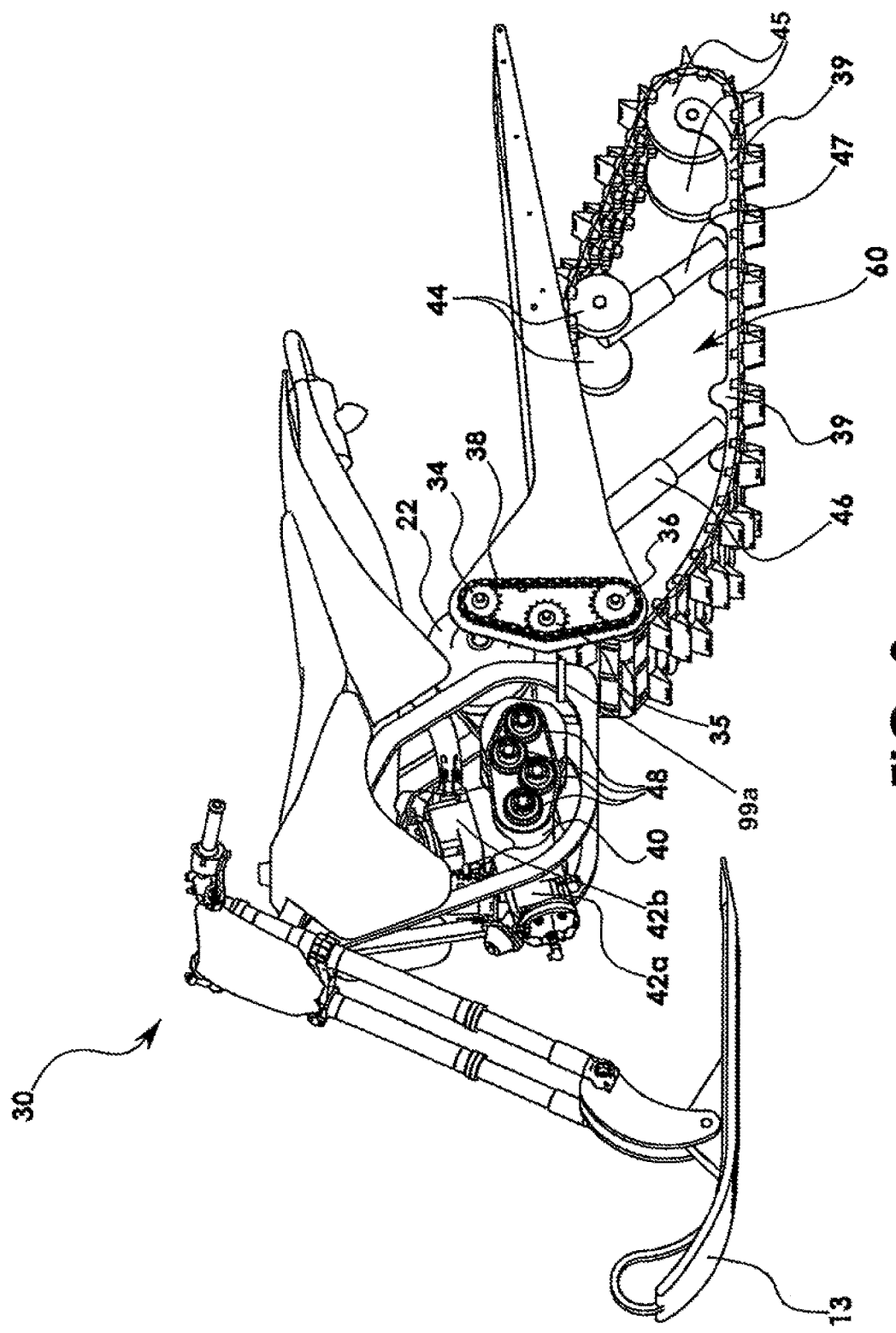
FIG. 3 is a left frontal perspective view of the narrow-profile straddle type motorized snow vehicle of the present invention, showing the location of manner of configuring a continuously variable transmission "(CVT")" to thereby avoid increased engine compartment width.
Figure 4:
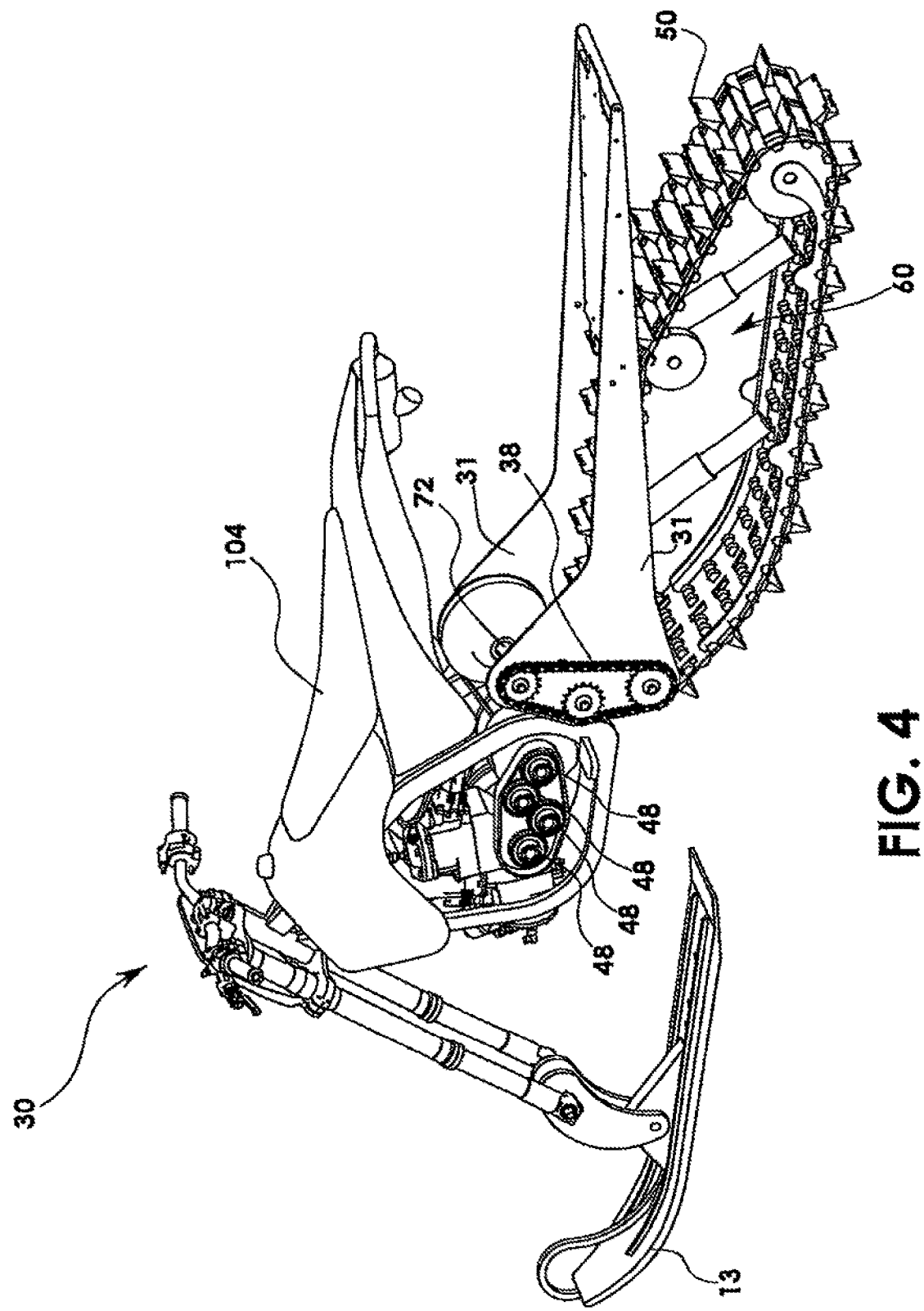
FIG. 4 is a left rear perspective view of the narrow-profile straddle type motorized snow vehicle of FIG. 3.
Figure 5:
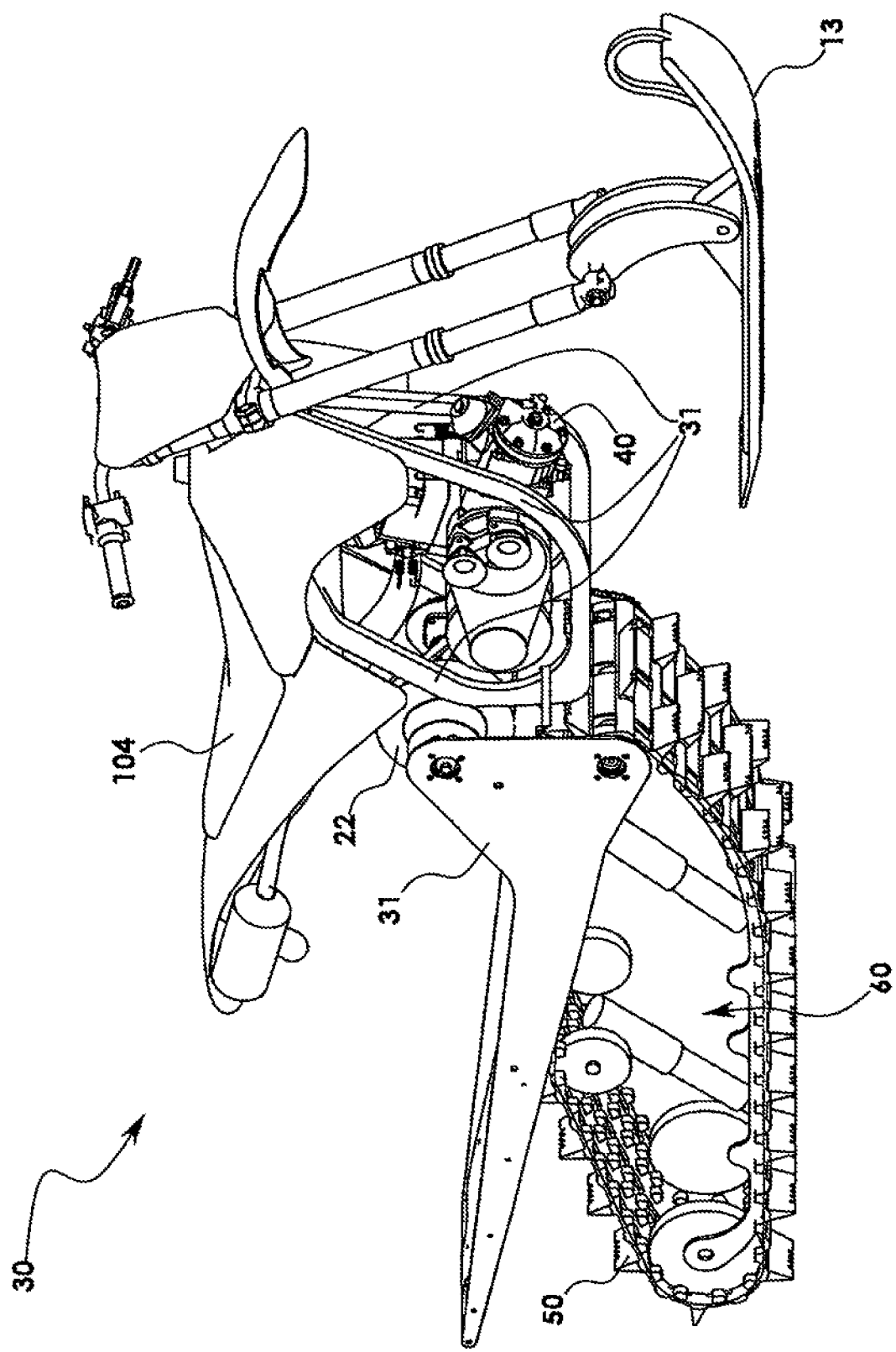
FIG. 5 is a right frontal perspective view of the narrow-profile straddle type motorized snow vehicle of FIG. 3, with a front fender added.
Figure 6:
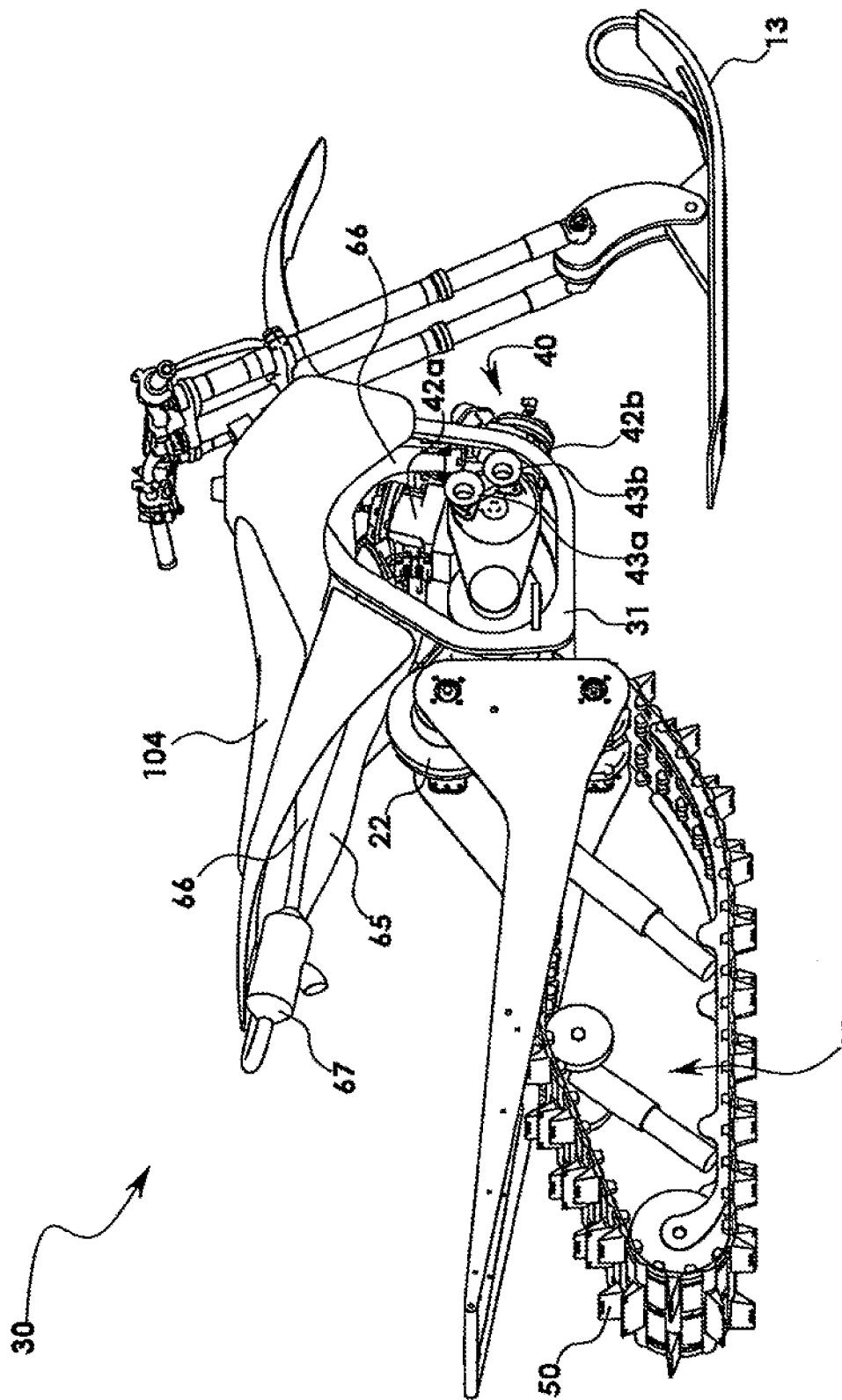
FIG. 6 is a right frontal perspective view of the narrow-profile straddle type motorized snow vehicle of FIG. 5.
Figure 7:
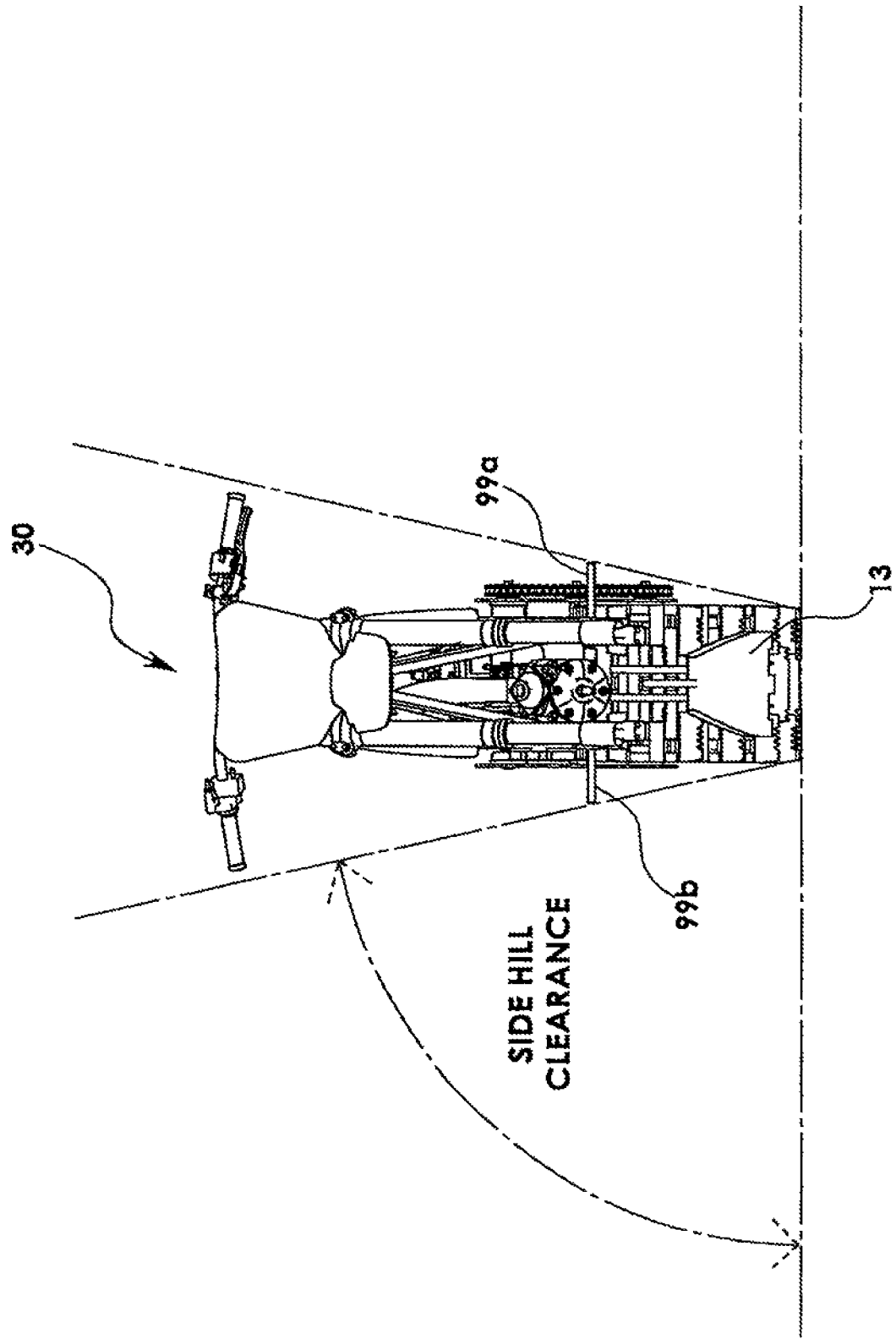
FIG. 7 is a front view of the narrow-profile straddle type motorized snow vehicle of FIG. 5, showing the resulting large side hill clearance now obtained.
Figure 8:
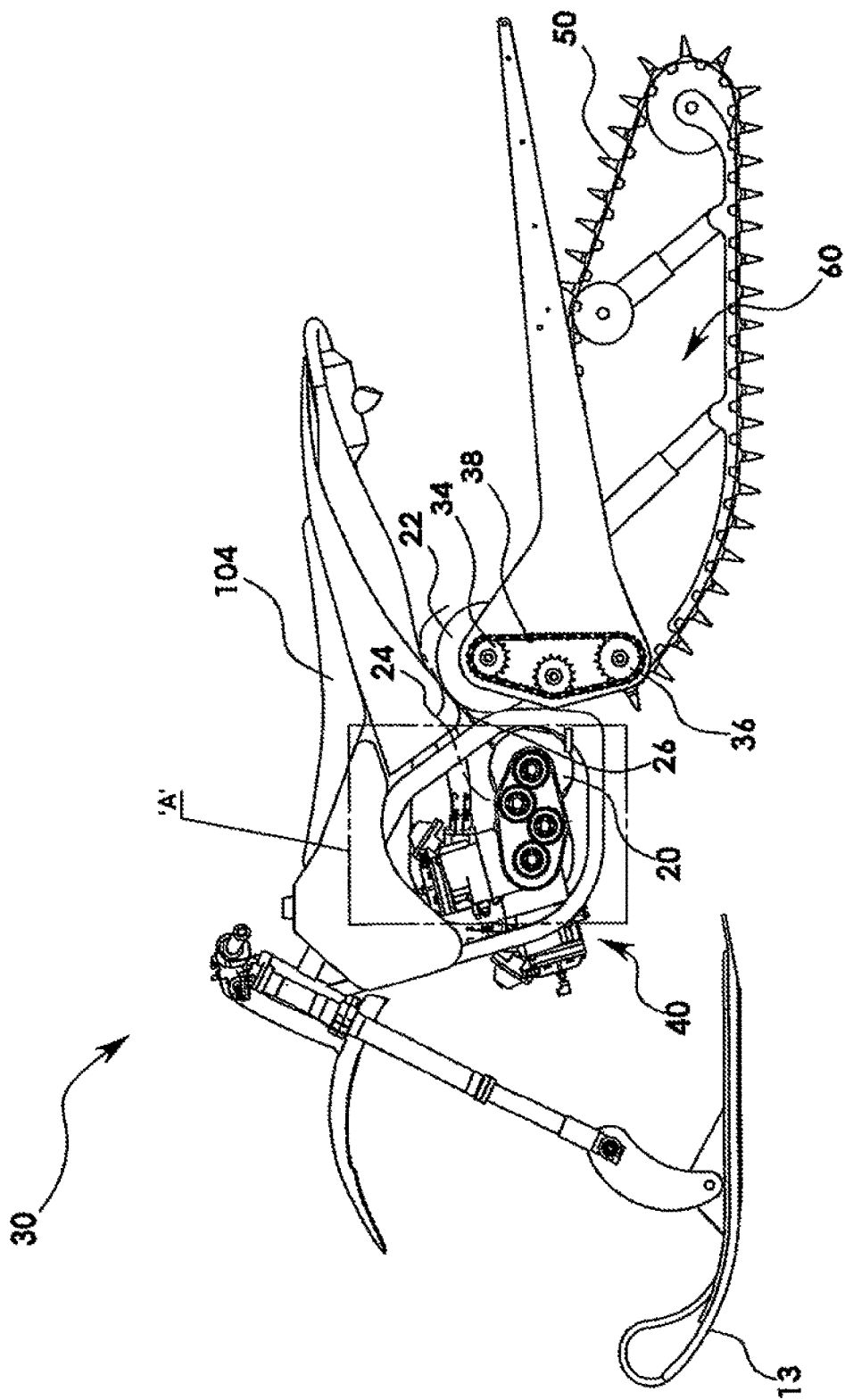
FIG. 8 is a left side elevation view of the narrow-profile straddle type motorized snow vehicle of FIG. 5.
Figure 9:
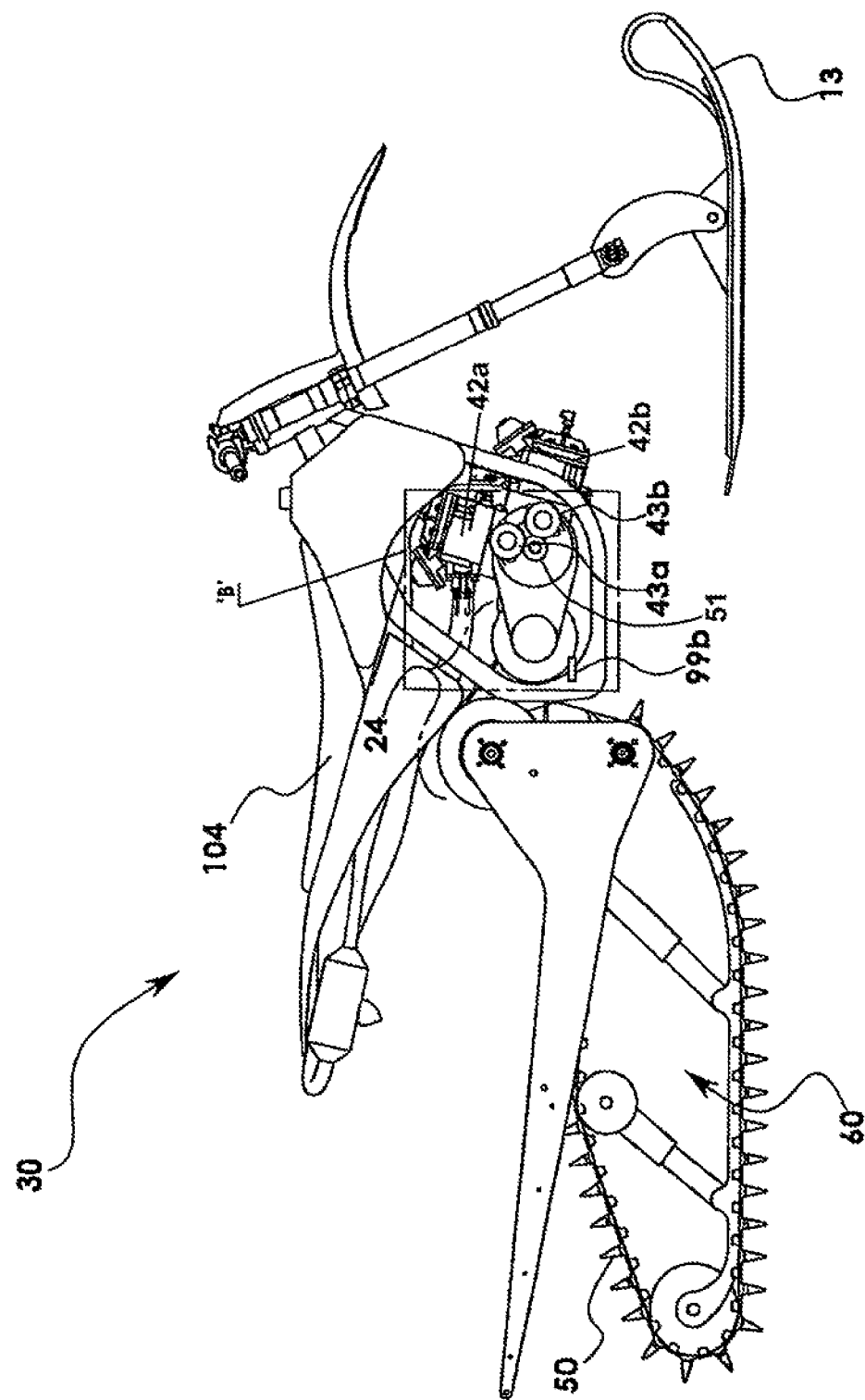
FIG. 9 is a right side elevation view of the narrow-profile straddle type motorized snow vehicle of FIG. 5.

FIG. 2 shows another motorized straddle-type snow vehicle 10 of the prior art having a motor 12 straddled by a vehicle operator/driver 11. Prior art snow vehicle 10 is steered by a single ski 13 and is typically powered by a rotatable endless belt (not shown) which contacts the ground/snow and allows propulsion of the vehicle 10. Use of a single ski 13 allows tilting of the vehicle 10 about a longitudinal axis along the direction of travel of the vehicle, which the operator 11 typically takes advantage of when traversing such inclined slope 4 as shown in FIG. 2 to "lean" into the direction of an inclined slope 4 to thereby avoid sliding down incline 4 and thus maintain an intended course when traversing inclined slope 4.

Disadvantageously, however, such prior art snow vehicles 10 typically has power transmission components 14 and/ or belt drive components 15 for the motorized track mounted on a side of motor 12 thereby increasing the total width of the motor 12 and thus vehicle 10. Such width was further effectively increased due to the width of the drivers' legs 18 when straddling the motor 12 and operating the vehicle 10 as shown in FIG. 2. Accordingly, due to such large width, large build-up of snow 9 would as a rule occur on the uphill side of vehicle 10 when such vehicle was attempted to be traversed along a length of inclined slope 4, rendering further passage along sloped incline 4 impossible at such angle of "lean" and causing the vehicle to slide downhill if such angle of "lean" was necessarily relaxed, or alternatively if such angle of "lean" was maintained then brushing the operator 11 from the seat on the vehicle 10 due to snow buildup 9 on the uphill side of vehicle 10.

The narrow-profile straddle type motorized snow vehicle 30 of the present invention is depicted in FIGS. 3-11, which show various views of the present invention.

As may be seen, due to its configuration of components and more specifically its transmission system as more fully described below, a snow vehicle having narrow width and profile is obtained, particularly in regions "A", "B" (ref. FIG.'s 8, 9, respectively), the latter being the regions where the operator's legs or boots 100 are approximately positioned when straddling vehicle 30 (ref. FIG.'s 12A, 13A).

With such configuration advantageously the operator is better able to take advantage of the single ski configuration of the vehicle, and the resulting increased side hill clearance better allows the vehicle and operator to traverse inclined slopes without sliding downhill and without the uphill leg or boot of the operator contacting the inclined slope and causing a build-up of snow on such uphill side.

With reference to FIGS. 3-11, 12A, 12B, 13A, & 13B, vehicle 30 of the present invention in one broad embodiment comprises a frame 31, having a single steerable ski 13 mounted thereto and forwardly of motor 40 to allow steering and support of vehicle 30 at a frontal end thereof. A conventional rotatable endless track 50 is mounted rearwardly on frame 31.

Track 50 of vehicle 30 is mounted within a suspension system 60, which in a preferred embodiment comprises a single shock absorber 46 intermediate two metal guide rails 39, a further shock absorber 47 affixed at one end to one of metal guide rails 39 and affixed at another end thereof to a pair of rotating bogey wheels 44 which assist in rotatably suspending track 50 within suspension system 60. A further pair of bogey wheels 45, pivotably or spring mounted to a lower of said metal guide rails 39, may further be provided within said track 50 at a distal (most rearwardly) end thereof to assist in guiding the track 50 over guide rails 39 and reducing the rolling friction of said track when powered by a motor 40.

Figure 12A:
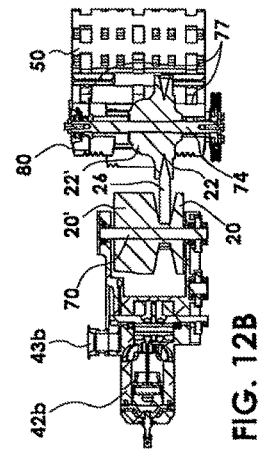
FIG. 12A is a side elevation view of the engine and transmission components only, in one embodiment/configuration of the present invention.
Figure 12B:
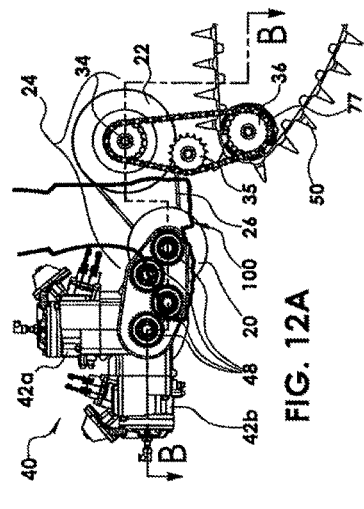
FIG. 12B is a cross-sectional view along plane B-B of FIG. 12A.

Motor 40, as further described below, is mounted on frame 31, and is typically a liquid—cooled two stroke internal combustion motor 40, comprising a first liquid cooled cylinder 42a and a second liquid cooled cylinder 42b, inclined at an "v" shaped angle to one another. Two stroke engines are generally preferred for their relative light weight and increased power to weight ratio in comparison to four stroke engines. Preferably, motor 40 is provided with forced air induction such as by way of a supercharger or turbocharger (not shown) mounted on motor 40 typically other than at a location of a lateral side thereof to avoid increasing the lateral width of the motor 40, to further increase the power to weight ratio of the motor 40 which is advantageous as the operator will lean the vehicle 30 when operating such vehicle 30 due to the single ski configuration, which leaning can be cumbersome and require substantial effort when a heavier, as opposed to a lighter, motor 40 is utilized. Motor 40 in all embodiments is mounted rearwardly of single ski 13 and forwardly of endless track 50. Also, while a four stroke due the resulting increased motor size and consequent increased lateral width of the engine in the location of the operator's legs 100 (ref. FIG. 12A, 12B), such will generally will have the above detrimental impact on the performance of the vehicle 30 when traversing inclined slopes 4 as discussed above, and thus the use of four stroke may only be suitable in reduced sizes and displacements of such engines.

The transmission of vehicle 30 for transmitting motor torque to endless track 50 is provided via a continuously variable transmission ("CVT") 24, located immediately rearwardly of, and not beside, motor 40. Use of a CVT, in comparison to motorcycle transmissions having selectable gears of various speed reducing and speed increasing ratios, is particularly suited for the within application due to its relatively narrow width. All components of CVT 24, in the configuration herein stipulated, can be positioned rearwardly of motor 40 and substantially along the vehicle 30 centerline, thereby eliminating any excess width which would otherwise be acquired by vehicle 30 if one or both of the primary 20 or secondary pulley 22 were to be mounted on the crankshaft of motor 40 and thus on the side of the motor 40.

In regard to the particular CVT contemplated for the arrangement of the present invention, CVT 24 comprises a primary pulley or sheave 20 mounted immediately rearwardly of, and driven indirectly or directly by in one of the manners hereinafter described, motor 40. Primary pulley 20 is located along a vertical plane aligned with a central longitudinal axis of vehicle 30 and located proximate, and preferably on, said central longitudinal axis. Primary pulley/sheave 20 which has an adjustable operating diameter for use with a mechanical belt endless belt 26. Specifically, primary pulley/sheave 20 in a preferred embodiment is constructed of two grooved halves. The two main "halves" of the pulley 20 can be moved closer together or farther apart, thus altering the operational diameter of pulley 20. The usual construction utilizes one half with a threaded central shaft and one half with a threaded center. By rotating the components one can "screw" the parts closer together or further apart, thus changing the distance between the two halves and allowing the belt 26 to ride higher or lower in the groove on pulley 20. Primary pulley 20 is mounted on a first transverse shaft 70 which is journalled for rotation at opposite ends within bearings 95a, 95b which are in turn affixed and mounted to frame 31. First transverse shaft 70 is operatively coupled, using one of the mechanisms elaborated on below, to motor 40. The rotational axis of first transverse shaft 70 is perpendicular (i.e. transverse) to a direction of travel and the central longitudinal axis of snow vehicle 30.

CVT 24 further comprises a similar secondary pulley/sheave 22 mounted rearwardly of primary pulley 20 and in said same vertical plane, which is operatively coupled via endless belt 26 to primary pulley 20. Like the construction of primary pulley 20, secondary pulley/sheave 22 is in a preferred embodiment constructed of two conically-grooved halves. The two main "halves" of the pulley 22 can be moved closer together or farther apart, by mechanism 22' in conjunction with the moving farther apart or closer together of halves of primary pulley 20 by mechanism 20'. Specifically, weights/cams (not shown) in mechanism 20' which rotate with primary pulley 20 move due to centrifugal force and thereby laterally moves one half sheave of pulley 20 further or closer to the opposite half sheave, in direct proportion to the speed of rotation. Actual lateral movement of one half sheave of primary pulley 20 relative to the other half sheave is controlled by rollers on helical ramps and a spring. The spring (not shown) is biased in one position so as to cause the effective diameter of the primary pulley 20' to be as small as possible at low or no rpm, namely so as to cause the two conical half sheaves of pulley 20 to be separated so as to thereby reduce the effective diameter of pulley 20 to a maximum extent. A spring forming part of mechanism 22" may further be provided for biasing the secondary pulley 22 to provide an opposite effect, namely to cause the two half sheaves of pulley 22 to be moved closer together at low or no rpm to thereby increase the effective diameter of pulley 22 to the greatest extent possible. At high motor rpm (and thus high rpm of primary pulley 20 and secondary pulley 22, each biasing of each of the two springs is overcome by the centrifugal force of the weights acting against the respective springs, so that the opposite result as to effective diameter of each pulley 20, 22 is achieved. In such manner the operational diameter of primary pulley 20 (greater or smaller) can be manipulated in a manner opposite to that of the secondary pulley (ie. smaller or greater, as the case may be), thus altering the speed and torque applied by pulley 20 to pulley 22 via belt 26. A detailed explanation as to the operation of a CVT 24 suitable for the purposes set out herein can be found at the internet URL location https://www.youtube.com/watch?v=uCEvBGT8twM which is incorporated herein by reference.

Figure 13A:
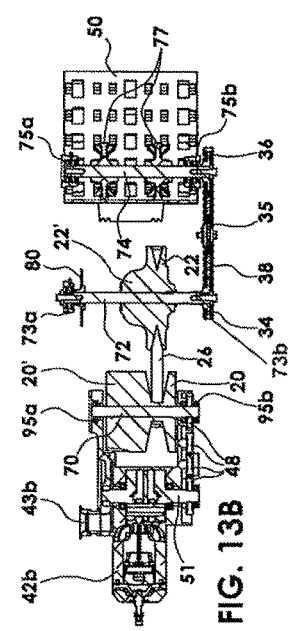
FIG. 13A is a side elevation view of the engine and transmission components only, in another embodiment/configuration of the present invention.
Figure 13B:
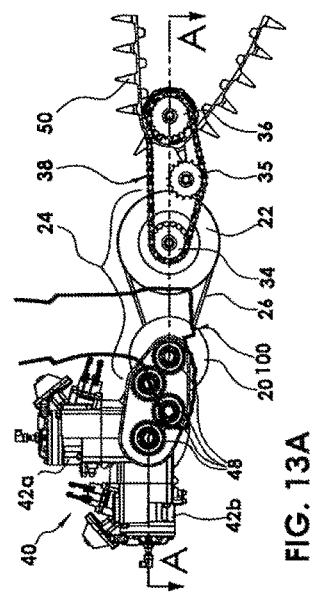
FIG. 13B is a is a cross-sectional view along plane A-A of FIG. 13A.

Secondary pulley 22 (and mechanism 22') is mounted on a second transverse shaft 72, which is likewise is journalled for rotation at opposite ends thereof within bearings 73a, 73b which are in turn affixed and mounted to frame 31. Second transverse shaft 72 is positioned parallel to but spaced rearwardly from first transverse shaft 70, as best shown in FIGS. 12B and 13B, and has mounted thereon, typically at one or other end thereof a driving pulley or sprocket 34.

It is preferred that the CVT 24 for the within application further incorporates an integral clutch arrangement, wherein the primary pulley 20 (which is initially, at low rpm's, of a small diameter, or applying high torque and low speed to secondary pulley 22) only becomes of larger diameter to tighten belt 26 and effectively drive secondary pulley 22 upon increased engine revolutions, namely upon pressure applied to a throttle to supply more fuel to motor 40. In such manner a separate centrifugal clutch (not shown) is not needed to allow the endless track 50 not to be directly coupled to motor 40 when motor 40 is merely idling and/or disk calipers are effectively braking rotation of said second and/or third transverse shafts 73, 74. Thus further motor width, due to not having to mount a centrifugal clutch (not shown) on a side of motor 40 such as at the location of idler gears 48, is not necessary and is thereby avoided.

A driven pulley or toothed sprocket 36, depending on whether a smooth or toothed belt (not shown) or alternatively an endless chain 38, is mounted on a third transverse shaft 74. Driving pulley or sprocket 34 mounted on second transverse shaft 72 is used via said belt or endless chain 38 to couple the second transverse shaft 72 to a third transverse shaft 74 and thereby provide rotational energy from the second transverse shaft 72 to the third transverse shaft 74 via driven pulley or toothed sprocket 36, and thus to endless track 50. Third transverse shaft 74 is rotatably journalled on frame 31 via bearings 75a, 75b at mutually opposite ends thereof, each positioned adjacent a proximal end of said endless track 50. Third transverse shaft 74 extends within endless track 50 at a proximal end of said endless track 50 as shown for example in FIGS. 12B, 13B, and has protruding sprockets 77 thereon for engaging and rotating endless track 50.

CVT 24 comprising primary pulley 20 secondary pulley 22 and an endless belt 26, operates in the manner of conventional CVT's in providing a selectable speed and mechanical advantage when providing motive force to endless belt 50. CVT 24's manner of operation is well within the knowledge of persons of skill in the art. One such CVT 24 particularly suited for the present application is a CVT manufactured by TEAM Industries, Inc. of 105 Park Avenue NW Bagley, Minn.

Specifically, CVT 24 operates to increase speed of endless belt 50 by pushing, in response to increased motor rpm and thus increased rotational speed of pulley 20, endless belt 26 towards the outer extremity of primary pulley 20 (namely moving the two halves of pulley 20 closer together via mechanism 20' to force endless belt 26 higher within a groove separating the two halves of pulley 20 and effectively thereby increasing the diameter of pulley 20), while simultaneously pushing endless belt 26 to inner extremities of secondary pulley 22 via mechanism 22', namely moving the two halves of pulley 22 farther apart together to allow endless belt 26 to ride lower on a groove separating the two halves of secondary pulley 22 and effectively thereby decreasing the diameter of secondary pulley 22 in response to increased rpm of primary pulley 20. CVT 24 operates in an opposite manner in response to lower motor rpm, namely pushing endless belt 26 to inner diametric extremity of primary pulley 20 and simultaneously pushing endless belt 26 to outer extremities of secondary pulley 22 in response to decreased rpm of primary pulley 20, to thereby increase torque applied to endless track 50 via driven pulley/sprocket 36 and third transverse shaft 74.

Figure 10:
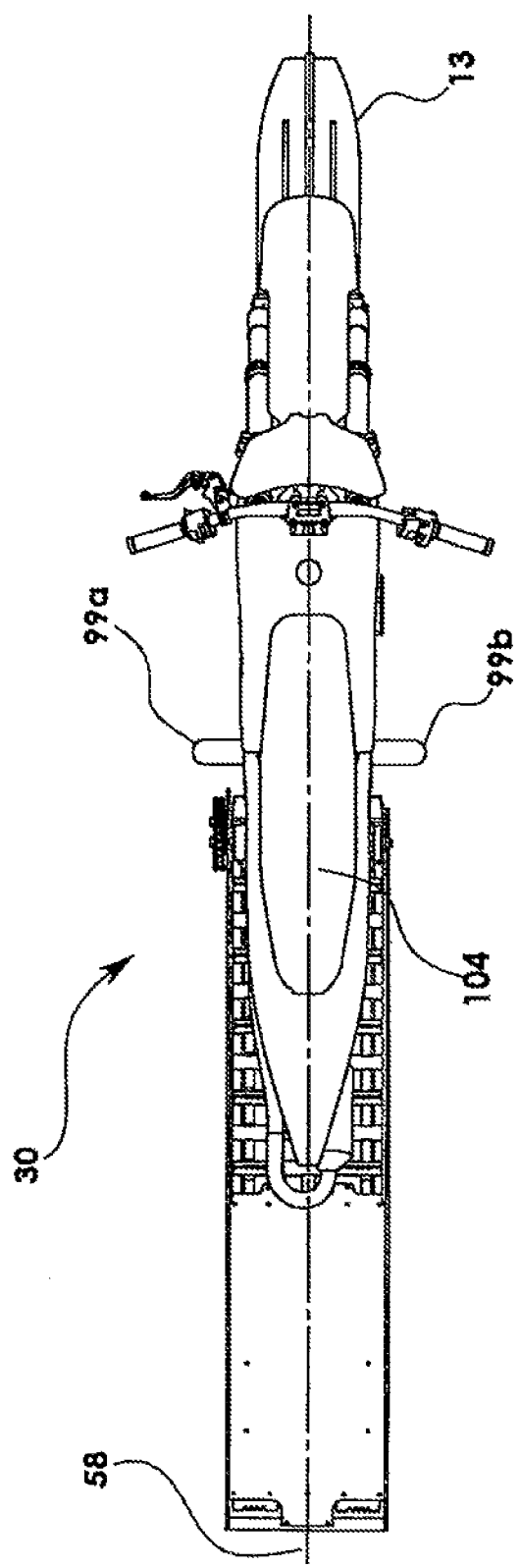
FIG. 10 is a top view of the narrow-profile straddle type motorized snow vehicle of FIG. 5, showing the narrow profile capable of being obtained as a result of the positioning of a primary and secondary pulley of a CVT aft of the engine.

In such manner, using a CVT in the aforementioned configuration the lateral width (profile) of vehicle 30 and the combined width of the operators legs when straddling the vehicle 30, when the operator footrests 99a, 99b (ref. FIG. 10) are placed on opposite side of motor 40, is reduced.

Preferably, to ensure the lateral width of motor 40 when mounted on frame 31 of vehicle 30 is a minimum, in a preferred embodiment motor 40 comprises a pair of cylinders 42a, 42b aligned in a plane of the longitudinal axis 58 of vehicle 30 and arranged in a canted "v" and coupled to a mutual crankshaft 51, wherein crankshaft 51 is positioned and aligned on frame 31 rearwardly of the cylinders 42a, 42b and transverse to the longitudinal axis 58 of vehicle 30. In such configuration power transmission from motor 40 to first transverse shaft 70 may be provided via one or more toothed gears 48, which drive a corresponding gear 48 mounted on first transverse shaft 70, as shown in FIGS. 3,4,8 & FIGS. 12A, 12B, 13A, 13B. Alternatively, a belt or chain (not shown) extending between crankshaft 51 and first transverse shaft 70, may be substituted in place of gears 48. It is noted that neither of gears 48 nor a belt (not shown) take up as much lateral width when mounted on a side of motor 40 as does one or other of primary 20 or secondary pulley 22, which pulleys 20, 22 of CVT 24 typically possess belt tensioning and repositioning mechanisms 20' and 22', as shown, which take up considerable more lateral width than do a simple belt or number of coplanar gears 48, as shown and as clearly evidenced in the cross-sectional views in FIG. 13A, 13B.

Advantageously, the second transverse shaft 72 in the arrangement of power transmission components, due to its position centrally of vehicle 30 between the first transverse shaft 70 and the third transverse shaft 74 and being usually in a raised position vertically above first transverse shaft 70 and third transverse shaft 74 and thus more clear of snow, is well suited to having an additional disk thereon, namely a disk 80 fixedly coupled thereto which brake calipers (not shown) can be applied to function as a disk brake to prevent further rotation of the endless track 50 and thus forward or rearward motion of vehicle 30. Accordingly, in a preferred embodiment the second transverse shaft possesses a disk brake 80 (calipers not shown). Similar disk(s) (not shown), along with associated brake calipers, may alternatively or in addition be provided on the third transverse shaft 74 to likewise provide disk braking To prevent stalling of motor 40 when disk brake 80 is applied or when the motor 40 is idling and the vehicle is stationary, a speed-activated integral clutch within CVT 24, comprising mechanisms 20', 22', operates in the manner described above to reduce the effective diameter of pulley 22 and increase in the effective diameter of pulley 22, along with simultaneously loosening tension applied to belt 26, thus disengaging of the driving of secondary pulley 22 by primary pulley 20.

Should it be desired, although not necessary when CVT's 24 of the type manufactured by TEAM Industries, Inc. are utilized which advantageously utilize by their manner of operation an integral clutch, a centrifugal clutch (not shown) may further be provided elsewhere on vehicle 30 and other than integral with CVT 24. In such an embodiment, a centrifugal clutch (not shown) may be located on and operatively coupled to first transverse shaft 70. Such positioning of a centrifugal clutch on vehicle 30 is advantageous in that disengagement of the motor 40 with first transverse shaft 70 results in disengagement (and thus unnecessary rotation of) all "downstream" transmission components. Examples of two currently available centrifugal clutches are Arctic Cat Z120/ZR120 snowmobile centrifugal clutch, Polaris XCR120/120 XC SP snowmobile centrifugal clutch.

Advantageously, in keeping with the design objective of minimizing vehicle 30 width, particularly where a two cylinder motor 40 is employed having each of such two cylinders 42*a*, 42*b* located in a vertical plane of the longitudinal axis 58 (see FIG. 10) of vehicle 30, each of cylinders 42*a*, 42*b* have an exhaust pipe 65, 66, respectively (see FIG. 6) extending rearwardly from such cylinders. Advantageously, due to the positioning of the primary and secondary pulleys 20, 22, particularly where primary pulley 20 is located vertically below, but forward of secondary pulley 22, such positioning allows exhaust pipes 65, 66 to then extend immediately above both primary and secondary pulleys 20, 22 and beneath the operator's seat 104, substantially along longitudinal axis 58, to thereby duct motor exhaust gases rearwardly of the operator, thereby keeping such (hot) exhaust pipes remote from an operator's legs, while nevertheless not increasing and thereby maintaining the width of vehicle 30 to a minimum. Exhaust pipes 65,66 may further, but need not necessarily, combine rearwardly of the operator's seat 104, into a single common muffler 67, as shown in FIG. 11, before motor exhaust therein is then expelled to atmosphere.

In the embodiment shown, respective cylinders 42*a*, 42*b* are separately provided with respective air inlets 43*a*, 43*b*, mounted on a side of motor 40, and preferably forwardly of the operator's legs 100 so as to not increase the motor width in the region of the operators legs 100. Of course, such motor air inlets 43*a*, 43*b* (see FIG. 6), may be located in other locations on the engine, remote from an engine side, particularly if forced induction, such as a turbocharger is utilized and such additional turbine components necessitate the positioning of the air 43*a*, 43*b* away from a side of motor 40 to thereby maintain a narrow profile motor 40 and vehicle 30.

Use of examples in the specification, including examples of terms, is for illustrative purposes only and is not intended to limit the scope and meaning of the embodiments of the invention set out and described in the disclosure. In the specification, the word "comprising" is used as an open-ended term, substantially equivalent to the phrase "including, but not limited to," and the word "comprises" has a corresponding meaning The scope of the claims should not be limited by the preferred embodiments set forth in the foregoing examples, but should be given the broadest interpretation consistent with the description as a whole, and the claims are not to be limited to the preferred or exemplified embodiments of the invention.

The embodiments in which an exclusive property and privilege is claimed are set out in the following claims:

1. A narrow-profile straddle-type motorized snow vehicle, comprising:
    a single ski mounted at a forward end of the vehicle for steering said vehicle;
    a rotatable endless track for providing propulsion in snow;
    a motor, mounted rearwardly of said single ski, and having a crankshaft;
    a continuously variable transmission (CVT), located rearwardly of said crankshaft, having:
        (i) a primary pulley mounted rearwardly of the crankshaft and located along a vertical plane aligned with a central longitudinal axis of said vehicle and located proximate said longitudinal axis of said vehicle, said primary pulley mounted on a first transverse shaft which is operatively coupled to said motor, a rotational axis of said first transverse shaft being transverse to a direction of travel of said snow vehicle;
        (ii) a secondary pulley mechanically coupled to said primary pulley, and configured in combination with said primary pulley to variably adjust the speed of the endless track and the torque applied thereto, the secondary pulley mounted rearwardly of said primary pulley and in said vertical plane, said secondary pulley mounted on a second transverse shaft, said second transverse shaft being positioned parallel to but spaced rearwardly from said first transverse shaft;
    and
    a driven pulley or toothed sprocket mounted rearwardly of a footrest of the vehicle, mounted for rotation on a third transverse shaft which is parallel to said first and second transverse shafts, said third transverse shaft extending within said endless track at a proximal end of said endless track for rotating said endless track, said driven pulley or toothed sprocket mounted on an end of said third transverse shaft adjacent said proximal end of said endless track and operatively coupled to said second transverse shaft.

2. The narrow-profile motorized snow vehicle as claimed in claim 1, wherein said driven pulley or toothed sprocket is positioned on said vehicle rearwardly of said primary pulley.

3. The narrow-profile motorized snow vehicle as claimed in claim 1, wherein said third transverse shaft is positioned on said vehicle below said second transverse shaft.

4. The narrow-profile motorized snow vehicle as claimed in claim 1, 2, or 3, wherein said third transverse shaft is positioned on said vehicle below said first transverse shaft.

5. The narrow-profile motorized snow vehicle as claimed in claim 1 wherein said driven pulley or toothed sprocket is operatively coupled to said second transverse shaft by an endless belt or chain.

6. The narrow-profile motorized snow vehicle as claimed in claim 1, wherein said CVT further includes an integral clutch adapted to decouple the motor from powering the endless track when the motor is at an idling rpm.

7. The narrow-profile motorized snow vehicle as claimed in claim 1, wherein said first transverse shaft and/or said second transverse shaft further comprises clutch means, configured to decouple the motor from powering the endless track when the motor is at idle rpm.

8. The narrow-profile motorized snow vehicle as claimed in claim 1, further having a centrifugal clutch, wherein said centrifugal clutch is located rearwardly of said motor on said first transverse shaft, and when engaged operatively couples said primary pulley to said secondary pulley upon non-idling revolutions of said motor.

9. The narrow-profile motorized snow vehicle as claimed in claim 1, wherein an operator-controlled disk brake is further located on said second transverse shaft.

10. The narrow-profile motorized snow vehicle as claimed in claim 1, wherein said motor comprises two cylinders, each of said cylinders located in the vertical plane of said longitudinal axis in a canted "v" format, each driving said crankshaft, said crankshaft located rearwardly of at least one of said two cylinders and transverse to said longitudinal axis and operatively coupled to said first transverse shaft, said first transverse shaft located rearwardly of said crankshaft.

11. The narrow-profile motorized snow vehicle as claimed claim 10, having an exhaust pipe extending from each of said cylinders, wherein each of said exhaust pipes extend rearwardly from said cylinders substantially along said longitudinal axis, above said continuously variable transmission and below a seat of said vehicle.

12. The narrow-profile motorized snow vehicle as claimed in claim 1, wherein said motor is a two stroke liquid-cooled piston engine.

13. The narrow profile motorized snow vehicle as claimed in claim 1, wherein said motor is provided with forced air induction via a turbocharger or supercharger, and wherein said turbocharger or supercharger is mounted, behind, or in front of the motor and not on a side of the motor.

* * * * *